United States Patent [19]
Horie

[11] Patent Number: 5,818,502
[45] Date of Patent: Oct. 6, 1998

[54] IMAGING FORMING APPARATUS WITH SMOOTHING CIRCUITRY

[75] Inventor: Hiromitsu Horie, Kawasaki, Japan

[73] Assignee: Fujitsu Limited, Kanagawa, Japan

[21] Appl. No.: 553,033

[22] Filed: Nov. 3, 1995

[30] Foreign Application Priority Data

Mar. 3, 1995 [JP] Japan ..................................... 7-043862

[51] Int. Cl.⁶ ...................................................... B41J 2/47
[52] U.S. Cl. ............................................................ 347/247
[58] Field of Search .................................. 347/240, 251, 347/252, 254, 131, 253; 358/298

[56] References Cited

U.S. PATENT DOCUMENTS

| | | |
|---|---|---|
| 3,573,789 | 4/1971 | Sharp et al. . |
| 4,314,261 | 2/1982 | Martinage ............................... 347/251 |
| 4,434,431 | 2/1984 | Ohkubo et al. . |
| 4,437,122 | 3/1984 | Walsh et al. . |
| 4,847,641 | 7/1989 | Tung . |
| 5,045,869 | 9/1991 | Isaka et al. ............................. 347/240 |
| 5,115,257 | 5/1992 | Takahashi .............................. 347/253 |
| 5,448,278 | 9/1995 | Tanimoto et al. ...................... 347/240 |

FOREIGN PATENT DOCUMENTS

| | | |
|---|---|---|
| 0356038 | 2/1989 | European Pat. Off. . |
| 3628915 | 3/1987 | Germany . |
| 4430649 | 2/1995 | Germany . |
| 61-214661 | 9/1986 | Japan . |

OTHER PUBLICATIONS

IBM Technical Disclosure Bulletin, vol. 26, No. 10B, Mar. 1984, pp. 5571–5572, entitled "Automatic Compensation of Digital Fonts in Laser–Driven Printers."

*Primary Examiner*—Mark J. Reinhart
*Attorney, Agent, or Firm*—Armstrong, Westerman, Hattori, McLeland & Naughton

[57] ABSTRACT

An image forming apparatus such as an electrophotographic type printer or a facsimile includes a laser diode and a photosensitive drum. A plurality of selective driving circuits are provided for driving the laser diode, and at least one of the driving circuits is selected to form dot images having variable sizes on the photosensitive drum in accordance with a given data supplied by a computer. The driving circuits have different driving currents, and a smaller dot image is formed when a driving circuit providing a lower driving current is selected. Also, delay elements are provided to form a dot image at a delayed timing. The apparatus also has a smoothing function to correct jaggies in a picture.

15 Claims, 14 Drawing Sheets

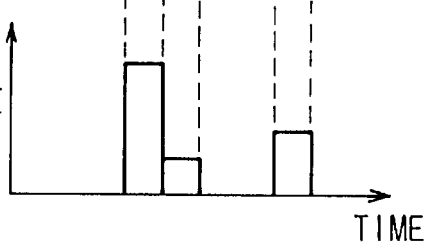
Fig. 6a NO1 DRIVING CIRCUIT — ON/OFF
Fig. 6b NO2 DRIVING CIRCUIT — ON/OFF
Fig. 6c NO3 DRIVING CIRCUIT — ON/OFF
Fig. 6d OUTPUT OF LASER DIODE vs TIME
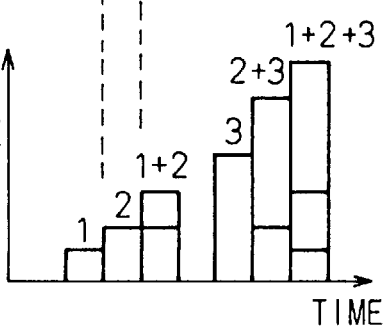
Fig. 7a NO1 DRIVING CIRCUIT — ON/OFF
Fig. 7b NO2 DRIVING CIRCUIT — ON/OFF
Fig. 7c NO3 DRIVING CIRCUIT — ON/OFF
Fig. 7d OUTPUT OF LASER DIODE vs TIME

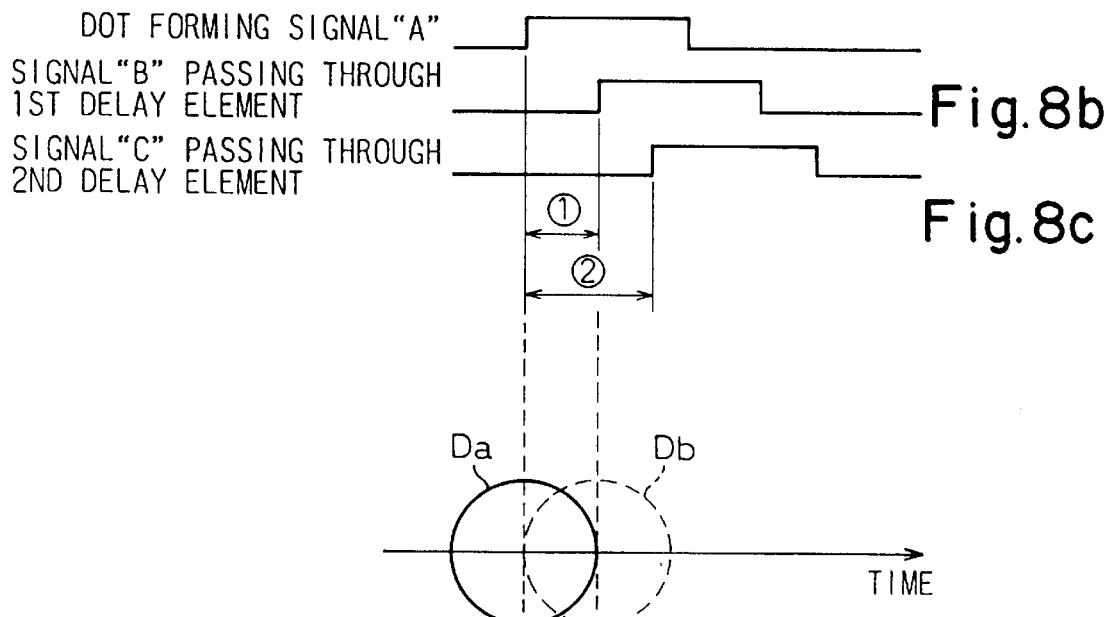
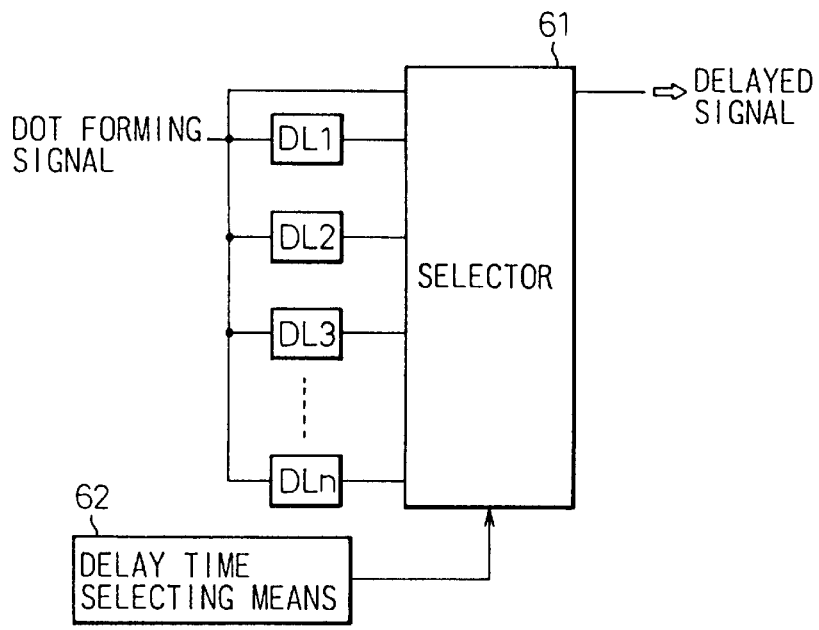

Fig. 12a BASIC DOT CLOCK
Fig. 12b DOT FORMING SIGNAL
Fig. 12c PRINTING POSITION CONTROLLING CLOCK
Fig. 12d DELAYED SIGNAL "C"
Fig. 12e DELAYED SIGNAL "D"

Dg

Dh

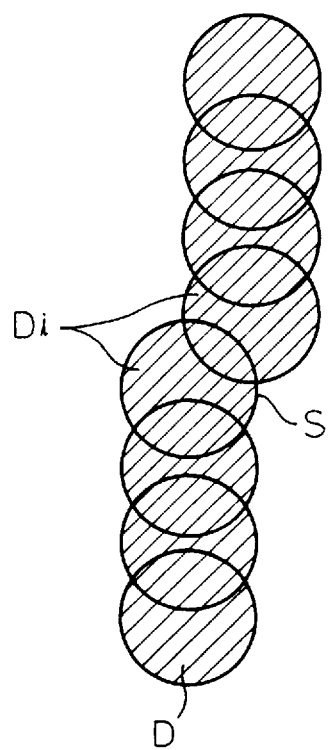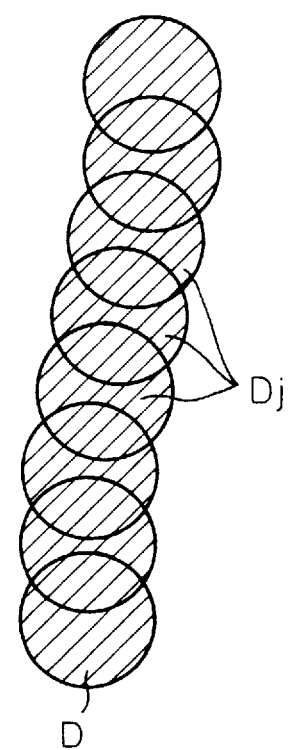

IMAGING FORMING APPARATUS WITH SMOOTHING CIRCUITRY

BACKGROUND OF THE INVENTION

1. Field of the Invention

The present invention relates to an image forming apparatus for forming dot images by scanning a laser beam across a photosensitive drum.

2. Description of the Related Art

Recording apparatuses such as electrophotographic type printers or facsimiles which can record dot images at a high speed have recently been developed and used in variety of fields. The recording apparatuses use a laser diode emitting a laser beam. The laser beam is scanned across a photosensitive recording member while the laser diode is turned on and off, so that dot images representing letters and figures are formed in accordance with given data such as a video signal delivered from a computer or the like.

In electrophotographic type printers, a demand for high-density recording and for gray scale capability is increasing. There are some gray scale capable methods known in the prior art. One of the gray scale capable methods changes an area in such a manner that the number of activated dots per unit area corresponding to one picture element is changed. Another known gray scale capable method changes a time period in such a manner that a time period for forming one dot image corresponding to one picture element is modulated. The time changing gray scale capable method can produce a good image having an intermediate gray scale value, but a problem occurs in the time changing gray scale capable method in that the shape and the position of the formed dot images are apt to vary, since the timing for forming dot images is changed.

A further gray scale capable method is to modulate the light emitting power of a laser for forming dot images. This gray scale capable method seems preferable but is not yet actually realized, because the laser diode is turned on and off for forming every dot image and a time period for forming one dot image is very short. It is very difficult to modulate a light emitting power of the laser diode during the formation of one dot image, and such a modulation has not actually been established.

Also, it is known that when a picture such as a letter or a figure is produced by a plurality of dot images, jaggies appear in such a picture depending a shape or direction of a line constituting a profile in the picture. The jaggies spoil the quality of the picture, and accordingly, it is desired to improve the quality of the picture.

U.S. Pat. No. 3,573,789, U.S. Pat. No. 4,437,122, and U.S. Pat. No. 4,847,641, and Japanese Unexamined Patent Publication (Kokai) No. 61-214661 disclose image forming apparatuses aimed to solve a problem concerning jaggies or the like. The improvements proposed in these prior arts are generally known as enhancement, expanding, or smoothing of dot images. In these prior arts, an area changing gray scale capable method, and a time modulating gray scale capable method are used.

SUMMARY OF THE INVENTION

The object of the present invention is to solve the above described problems and to provide an image forming apparatus by which a gray scale capable method can be facilitated.

Another object of the present invention is to solve the above described problems and to provide an image forming apparatus by which a gray scale capable method can be facilitated to improve the quality of a formed picture comprising a plurality of dot images.

According to the present invention, there is provided an image forming apparatus comprising a photosensitive member, a laser source emitting a laser beam for irradiating the photosensitive member while scanning the laser beam across the photosensitive member, driver means for driving the laser source to form dot images on the photosensitive member in accordance with given data, the driving means including a plurality of selective driving circuits providing different driving currents, and control means for selecting at least one of the driving circuits in accordance with the given data.

In this arrangement, a plurality of driving circuits providing different driving currents are arranged for one laser source. For example, driving currents may be $I_1$, $I_2$, and $I_3$, (here, $I_1 > I_2 > I_3$). The control means judges the given data, and may select the first driving circuit providing the driving current $I_1$ when it is judged that a larger dot image is to be formed. The laser source is thus driven by the driving current $I_1$, and emits an intense laser beam so that a larger dot image is formed on the photosensitive member. On the other hand, the control means may select the third driving circuit providing the driving current $I_3$ when it is judged that a smaller dot images is to be formed, and the laser source emits a weak laser beam so that a smaller dot image is formed on the photosensitive member. It may be possible to select more than two driving circuits simultaneously, so that the laser source is driven by the sum of the driving currents of the selected driving circuits and emits a strong laser beam so that a larger dot image is formed on the photosensitive member.

In this way, a formed dot image has a size corresponding to a current determined by the selected at least one driving circuit.

Preferably, the control means further includes clock means for cyclically delivering a clock signal at a predetermined interval to form dot images along a scanning line, and delay means for causing the laser source to emit a laser beam at a delayed timing relative to a timing determined by the clock means.

Preferably, the delay means comprises at least one of delay lines, non-inverting elements and inverting elements. If the delay means comprises delay lines, the transmission of a dot forming signal which passes through a delay line is delayed by its own delay time. If the delay means comprises non-inverting elements arranged in series or inverting elements arranged in series, the transmission of a dot forming signal which passes through one non-inverting element or one inverting element is delayed by a delay time corresponding to one delay element and a total delay time when the transmission of a dot forming signal which passes through non-inverting elements or inverting elements corresponds to sum of delay times of the passed delay elements. Alternatively, the delay means comprises means for electrically modifying a clock signal of the clock means. For example, a printing position control clock having a frequency higher than that of the clock signal of the clock means is used for delaying a starting point of a dot forming signal so that the dot forming signal is held for a time of a clock interval or several clock intervals to delay the dot forming signal.

Preferably, each of the driving circuits includes a transistor. In particular, each of the driving circuits includes a transistor and a resistor.

Preferably, the dot images are subsequently converted into toner images. In this case, the apparatus further comprises dot selecting means for changing the control means between a first mode of operation in which a driving circuit providing a first driving current is selected for forming a certain dot image and a second mode of operation in which a driving circuit providing a second driving current is selected for forming a certain dot image identical to the certain dot image formed by the first driving current, the first driving current being different from the second driving current. The dot selecting means may comprise a manual switch, and it is possible to reduce the consumption of toner by selecting one of the modes of operation by which a smaller dot image is formed.

Preferably, the control means includes means for generating a dot forming position signal and a driver selecting signal, and driver selecting means for selecting at least one of the driving circuits in response to the dot forming position signal and the driver selecting signal.

In this case, preferably, the control means further includes smoothing means for smoothing and rearranging a shape of a picture comprising a plurality of dot images to be formed relative to a shape of a picture comprising a plurality of corresponding dots in a given data. The smoothing can be applied in the following way.

When an inclined line is to be formed by the dot images, a driving circuit providing a third driving current is selected, the third driving current being greater than a driving current provided by another driving circuit which is to be selected when a vertical or horizontal line is formed.

When a cross shape having a crossing point is to be formed by the dot images, a driving circuit providing a fourth driving current is selected for forming dot images on or near the crossing point, the fourth driving current being smaller than a driving current provided by another driving circuit which is to be selected when a vertical or horizontal line is formed.

When a vertical line extending generally perpendicular to a scanning direction and having a step therein is to be formed by the dot images, the dot images on or near the step being displaced in the scanning direction to smooth the step.

When a horizontal line extending generally parallel to a scanning direction and having a step therein is to be formed by the dot images, a driving circuit providing a fifth driving current is selected, the fifth driving current being smaller than a driving current provided by another driving circuit which is to be selected when a vertical or horizontal line is formed.

When the dot images on or near the step are formed the dot images are divided into a plurality rows of small dot images extending parallel to a scanning direction.

BRIEF DESCRIPTION OF THE DRAWINGS

The present invention will become more apparent from the following description of the preferred embodiments, with reference to the accompanying drawings, in which:

FIG. 6 is a timing chart illustrating the relationship between the diode driving circuits and the laser diode;

FIG. 7 is a timing chart illustrating another example of the relationship between the diode driving circuits and the laser diode;

FIG. 8 is a timing chart illustrating an example of the formation of a dot image using a delay element;

FIG. 9 is a block diagram of an example of the delay circuit including delay lines;

FIG. 12 is a timing chart illustrating a further example of the delay means using a printing position controlling clock;

FIG. 16A is a view of the dot images representing a vertical line having a step;

FIG. 16B is a view of the dot images similar to those of FIG. 16A, the dot images on or near the step being displaced in the scanning direction;

DESCRIPTION OF THE PREFERRED EMBODIMENTS

Figure 1:
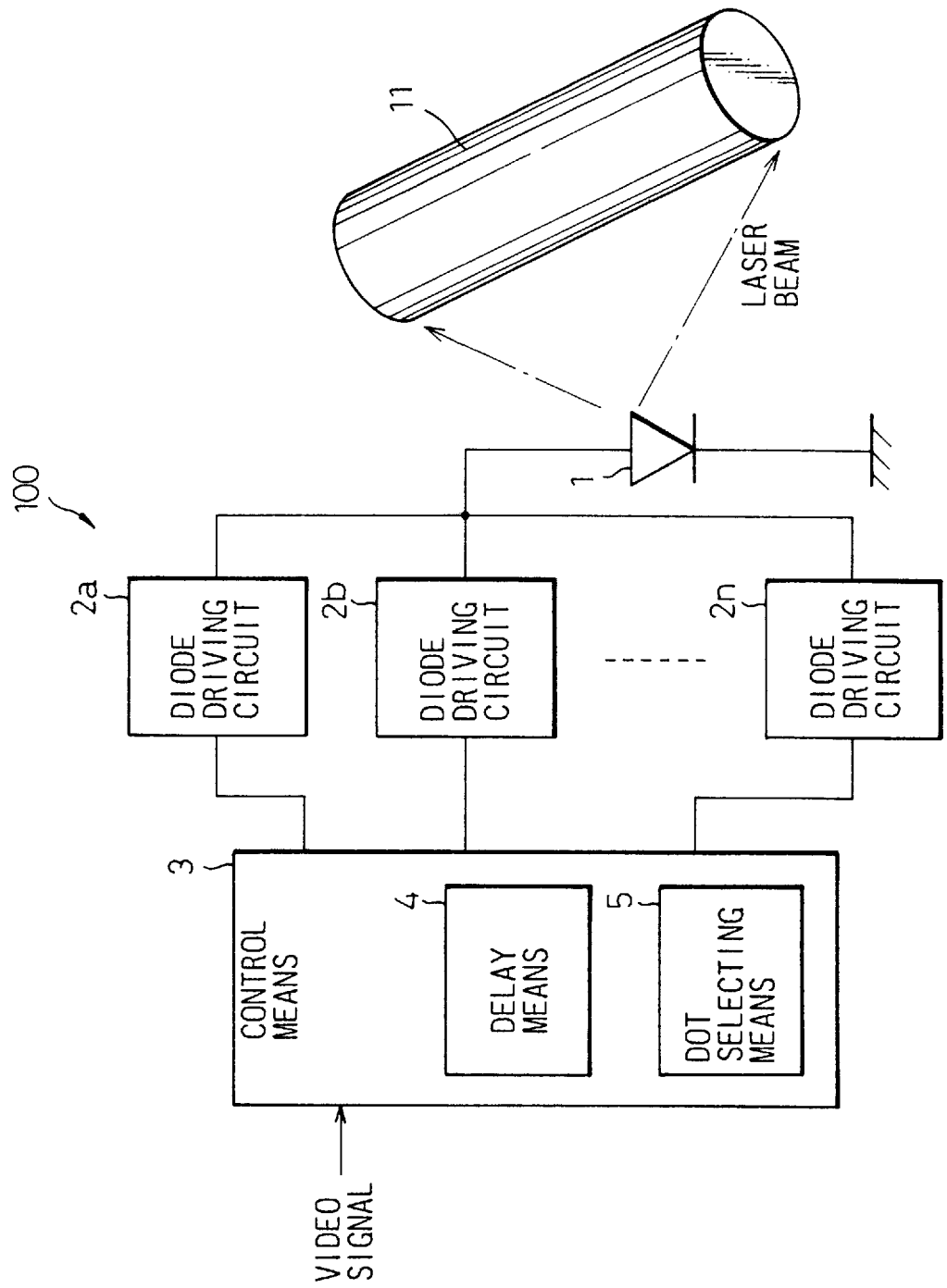
FIG. 1 is a principle view illustrating a fundamental feature of the present invention.

FIG. 1 shows a fundamental feature of the present invention. An image forming apparatus 100 comprises a photosensitive drum 11, and a laser diode 1 as a laser source emitting a laser beam for irradiating the photosensitive drum 11 while scanning the laser beam across the photosensitive drum 11. Driver means comprising a plurality of selective driving circuits 2a, 2b, . . . , and 2n for driving the laser diode 1 is provided to form dot images on the photosensitive drum 11 in accordance with a given data. The driving circuits 2a, 2b, . . . , and 2n provide different driving currents, respectively. Control means 3 is provided for selecting at least one of the driving circuits 2a, 2b, . . . , and 2n in accordance with a given data. A video signal or a dot forming signal is input into the control means 3 to give data necessary to form dot images. Therefore, the laser diode 1 can be driven by the selected at least one driving circuit and emits a laser beam which may vary so that the size of the formed dot image changes. The control means 3 may further includes delay means 4 and dot selecting means 5.

FIGS. 2 to 5A show an electrophotographic type printer as an embodiment of an image forming apparatus according to the present invention. The printer 100a includes a mechanical part 30 and a controller 26 for controlling the mechanical part 30.

The mechanical part 30 includes an optical exposure unit 31 having a laser diode 32 (FIG. 3), and a photosensitive drum 11. The photosensitive drum 11 has a layer of a photoconductive (photosensitive) material on the surface thereof and is rotatable in the direction of the arrow A in FIG. 2. The laser diode 32 emits a laser beam for irradiating the photosensitive drum 11 to form an electrostatic latent image in the form of dots on the photosensitive drum 11, by turning on and off the laser diode 32, in accordance with a given printing data. The mechanical part 30 also includes a forward charger 12 for uniformly charging the surface of the photosensitive drum 11, and a developing unit 14 with a toner supply 13 and a magnet roll (developing roll) 15 for forming a toner image corresponding to the electrostatic latent image.

The mechanical part 30 also includes a transfer charger 17 for transferring the toner image to a printing paper CP conveyed by conveying rollers 16 and 18 in the direction of the arrow B, a heat fixing unit 20 having fixing rollers 19 for fixing the toner image on the paper CP, an optical static eliminator 21 for irradiating the photosensitive drum 11 with a light to remove the charge remaining on the photosensitive drum 11, and a cleaner 23 having a brush 22 and a blade 24 for cleaning and removing the toner from the photosensitive drum 11. The paper sheets CP are fed one by one by a hopper (not shown) on the right side end in FIG. 2, and conveyed through the transfer charger 17 and the fixing unit 20 to a stacker (not shown) on the left side end in FIG. 2.

Figure 3:
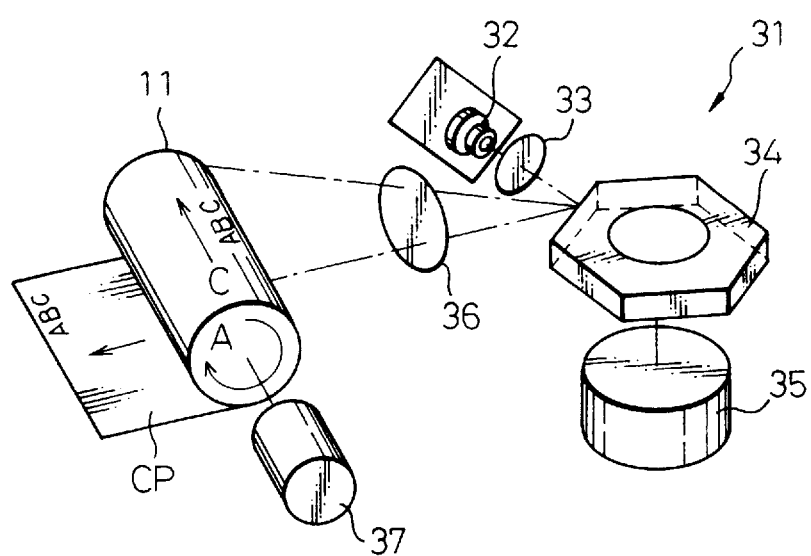
FIG. 3 is a diagrammatic perspective view of the optical unit of FIG. 2.

FIG. 3 shows the optical unit 31 including the laser diode 32, a collimator lens 33, a polygon mirror 34 for scanning the laser beam in the longitudinal direction of the photosensitive drum 11 (in the direction of the arrow C in FIG. 3), an F-θ lens (imaging lens) 36, and a spindle motor 35 for rotating the polygon mirror 34. A spindle motor 37 is provided for rotating the photosensitive drum 11 in synchronism with the polygon mirror 34.

Figure 2:
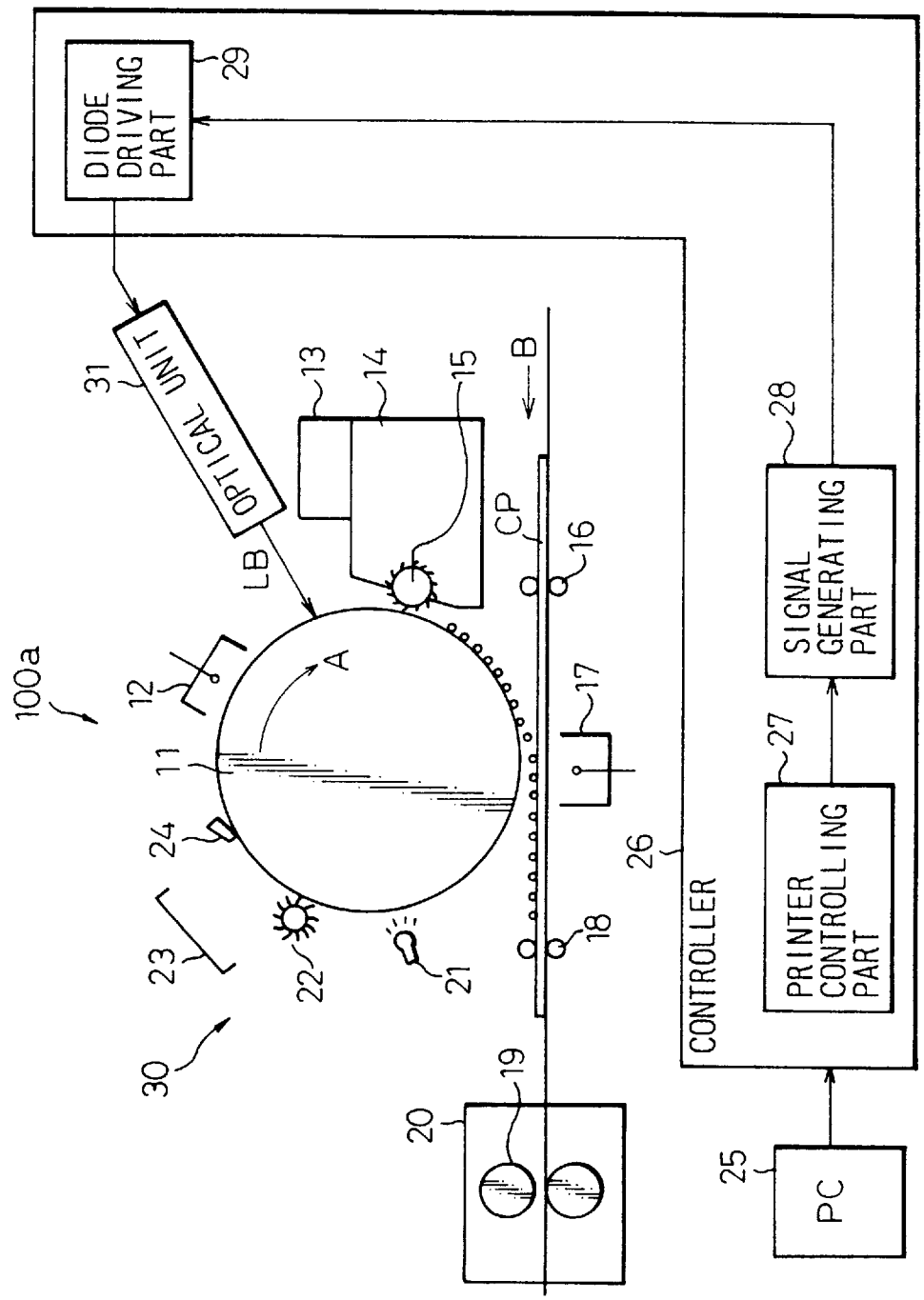
FIG. 2 is a diagrammatic view of an electrophotographic type printer as an embodiment of an image forming apparatus according to the present invention.

The controller 26 includes a printer controlling part 27, a signal generating part 28, and a diode driving part 29, as shown in FIG. 2. The printer controlling part 27 receives the printing data representing an image such as letters and figures from a personal computer (PC) 25 and stores the received data in page buffers. The data stored in each page buffer is converted into a video signal adapted to produce dot images. The signal generating part 28 generates a dot forming position signal and a driver selecting signal, depending on the video signal. The signal generating part 28 also generates other signals such as a control clock signal or the like.

The diode driving part 29 drives the laser diode 32, by turning on and off the laser diode 32, in synchronism with the scanning of the laser beam, in accordance with the video signal. The laser beam, modulated on and off, reaches the polygon mirror 34 via the collimator lens 33. The polygon mirror 34 is driven in rotation at a constant speed by the spindle motor 35, and causes the incident laser beam to be repeatedly moved in the longitudinal direction of the photosensitive drum 11 via the F-θ lens 36. Therefore, an electrostatic latent image is formed on the surface of the photosensitive drum 11, by rotating the photosensitive drum 11 in the direction of the arrow A, by scanning the laser beam in the longitudinal direction of the photosensitive drum 11, and by modulating the laser beam on and off in accordance with a dot forming data. In addition, the diode driving part 29 determines the position of the dot images to be formed and selects driving circuits, as described below.

The basic operation of the printer 100a is known. That is, when the laser beam is irradiated in the form of an optical image onto the surface of the photosensitive drum 11 which is uniformly positively charged by the forward charger 11, a portion of the charge against which the laser beam impinges is removed from the surface of the photosensitive drum 11, so an electrostatic latent image is formed on the surface of the photosensitive drum 11. The magnet roller 15 in the developing unit 14 which is biased to a predetermined positive developing voltage rotates in a relationship with the photosensitive drum 11 so that a positively charged toner is applied to the photosensitive drum 11 and the toner is transferred onto the electrostatic latent image. The electrostatic latent image is thus converted into a toner image. In the transfer charger 17, a corona discharge at a negative polarity is applied to the toner image on the reverse side of the paper CP from the toner image, with the result that the toner image is transferred from the photosensitive drum 11 to the paper CP.

The paper CP is conveyed to the fixing unit 20 to thermally fix the toner image, and is conveyed to the stacker. The photosensitive drum 11 continues to rotate after the toner image is transferred to the paper PC, so that the remaining charge on the photosensitive drum 11 is removed by the optical static eliminator 21, and the photosensitive drum 11 is cleaned by the cleaner 23. The photosensitive drum 11 is then ready to form an electrostatic latent image in the next cycle.

Figure 4:
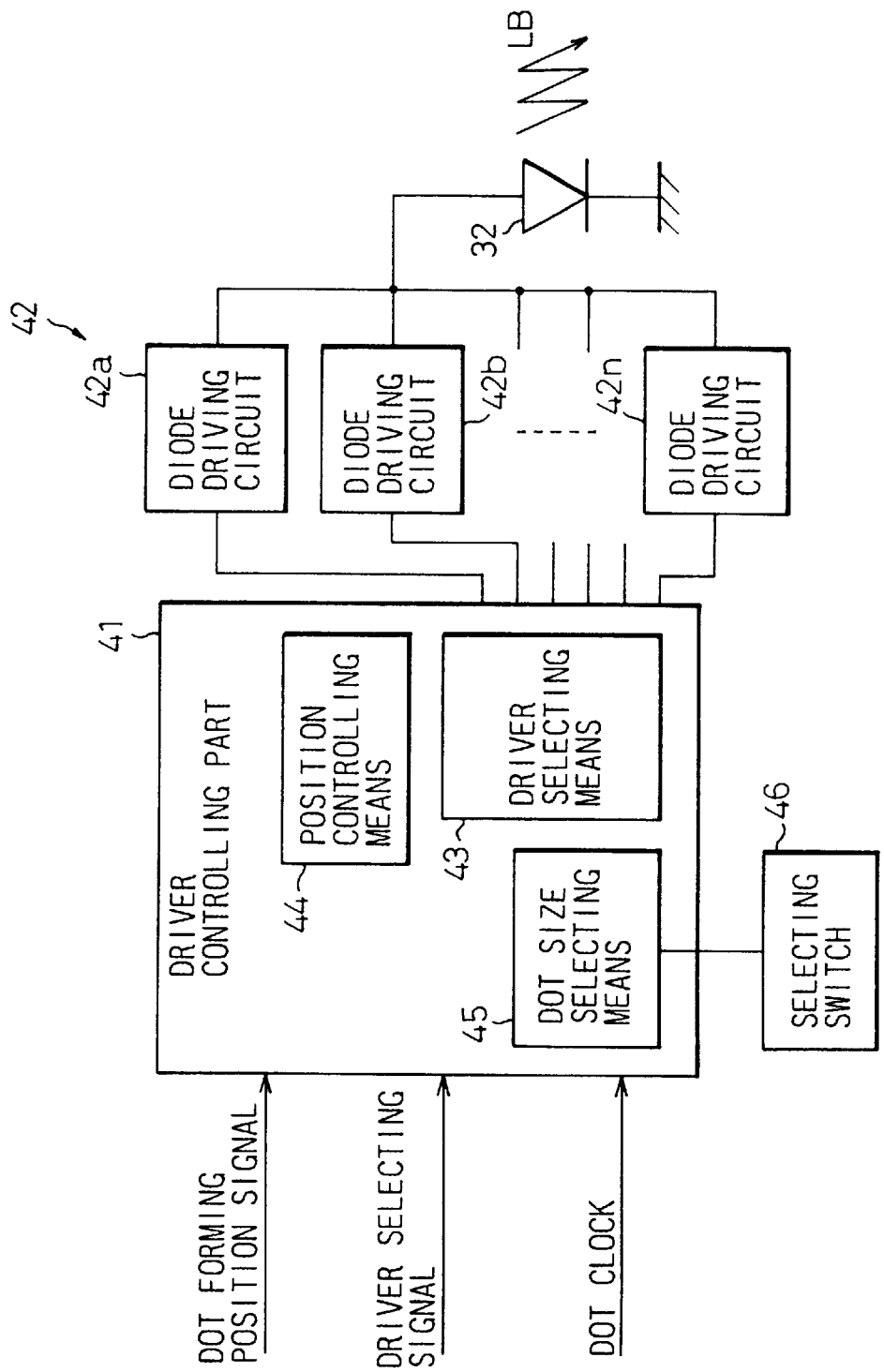
FIG. 4 is a block diagram of the diode driving part of FIG. 2.

FIG. 4 shows the details of the diode driving part 29. The diode driving part 29 includes a driver controlling part 41 and a diode driver 42 for supplying a driving current to the laser diode 32. The diode driver 42 comprises a plurality of driving circuits 42a, 42b, . . . , and 42n providing different driving currents $I_1$, $I_2$, and $I_n$, respectively.

The driver controlling part 41 includes driver selecting means 43 which selects at least one of the driving circuits 42a, 42b, . . . , and 42n and delivers a driving signal in the form of a pulse having a predetermined length to the selected driving circuit, in accordance with the driver selecting signal, the dot forming position signal and the clock signal. Therefore, the laser diode 32 is driven by the selected at least one driving circuit having a particular driving current. It will be understood that the printing data provided by the PC 25 includes a gray scale information, and the driving circuit can be selected in accordance with the gray scale information. In addition, the driving circuit can be selected in accordance with a smoothing technique, achieved by analyzing and identifying patterns or shapes of a picture such as letters and figures comprising a plurality of dot images, as described below.

The driver controlling part 41 also includes position controlling means 44 which includes a delay means to displace the dot forming position, in accordance with the dot forming position signal. The driver controlling part 41 also includes dot size selecting means 45 which can select the size of the dot images to be formed depending on a (manual) selecting switch 46 arranged outside the controller 26.

Figure 5A:
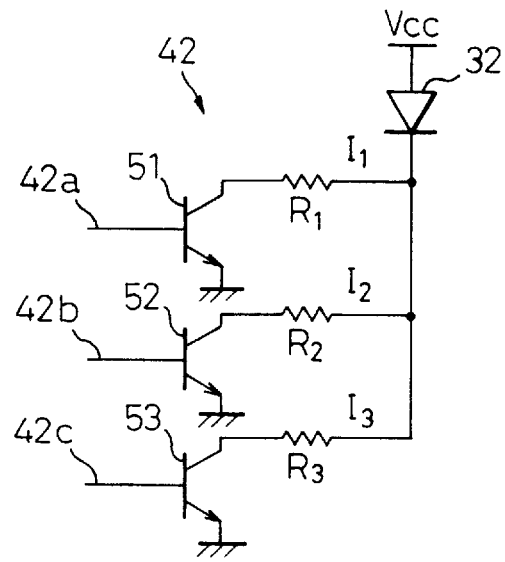
FIG. 5A is a circuit diagram of an example of the diode driver.

FIG. 5A shows a circuit diagram of the diode driver 42 comprising three laser driving circuits 42a, 42b, and 42c. Each of the laser driving circuits 42a, 42b, and 42c includes an NPN transistor 51, 52, or 53 and a resistor $R_1$, $R_2$, or $R_3$. Therefore, the laser driving circuits 42a, 42b, and 42c have different driving current $I_1$, $I_2$, and $I_3$. When one of the transistors 51, 52, and 53 is turned on, a driving current $I_1$, $I_2$, or $I_3$ flows through the laser diode 32 which emits a laser beam with an intensity corresponding to the supplied driving current. In addition, the laser driving circuits 42a, 42b, and 42c are arranged in parallel to each other, and the sum of the driving currents flows through the laser diode 32 when two or three of the transistors 51, 52, and 53 are simultaneously turned on.

Figure 5B:
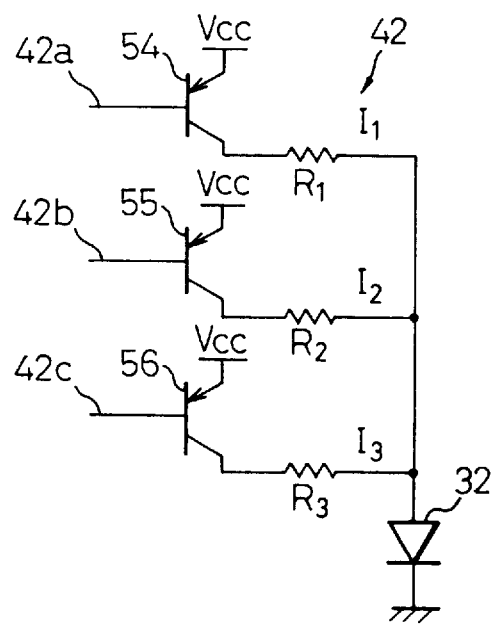
FIG. 5B is a circuit diagram of another example of the diode driver.

FIG. 5B shows a circuit diagram of another example of the diode driver 42 comprising three laser driving circuits 42a, 42b, and 42c. PNP transistors 54, 55, and 56 are used in this example in place of the transistors 51, 52, and 53 of FIG. 5A, but the operation of this example is similar to the example of FIG. 5A. If the transistors 51, 52, and 53 or transistors 54, 55, and 56 themselves can provide different driving currents, resistors can be omitted. Also, it is possible to use any type of transistors, for example, FET transistors. Since 256 gray scale values are provided by the PC 25, it is preferable that the diode driver 42 comprises three to eight laser driving circuits to obtain an appropriate gray scale capable method.

Accordingly, it is possible to regulate the light emitting power of the laser diode 32 by selecting the laser driving circuits 42a, 42b, and 42c providing the different driving currents. The laser diode 32 emits a laser beam intensively and the dot image formed on the photosensitive drum 11 has a large size, when the selected driving current is high. Similarly, the laser diode 32 emits laser beam weakly and the dot image formed on the photosensitive drum 11 has a small size, when the selected driving current is low.

FIG. 6 shows the relationship between the diode driving circuits 42a, 42b, and 42c and the laser diode 32. It is possible to regulate the light emitting power of the laser diode 32 for every dot by selecting the laser driving circuits 42a, 42b, and 42c, as shown in FIG. 6. In this example, the light emitting power is varied in the order of the laser driving circuits 42a, 42c, and 42b, and the largest dot image is formed when the laser driving circuit 42a is selected.

FIG. 7 shows another example of the relationship between the diode driving circuits 42a, 42b, and 42c and the laser diode 32. This example shows that a plurality of the diode driving circuits 42a, 42b, and 42c can be simultaneously selected, and the sum of the light emitting powers is obtained. For example, the laser driving circuit 42a provides a driving power of 0.1 mW, the laser driving circuit 42b provides a driving power of 0.2 mW, and the laser driving circuits 42c provide a driving power of 0.4 mW. When the diode driving circuits 42a and 42b are simultaneously selected, the driving power of 0.3 mW is obtained. When the diode driving circuits 42b and 42c are simultaneously selected, the driving power of 0.6 mW is obtained.

FIG. 8 shows the formation of a dot image which is displaced in the scanning direction using a delay element. A dot forming signal "A" is delivered to the driver part 42 at a predetermined timing in synchronism with a clock signal. When the dot forming signal "A" is passed through a fist delay element, the transmission of the dot forming signal is delayed and a delayed signal "B" is produced. When the dot forming signal "A" is passed through a second delay element, the transmission of the dot forming signal is delayed and a delayed signal "C" is produced. In this way, the first and second delay elements cause the dot forming signal "A" to be delayed. In particular, the starting point of the dot forming signal "A" is delayed, as shown by the characters 1 and 2, with the duration time of the pulse unchanged. Therefore, the dot image Da is displaced with respect to the dot image Db, when the first delay element is used.

FIG. 9 shows an example of the delay circuit including delay lines. The delay circuit is provided in the position controlling means 44 in the driver controlling part 41, and includes a plurality of delay lines (for example, inductance elements) DL1, DL2, . . . and DLn, a selector 61, and a delay time selecting part 62. The delay time selecting part 62 delivers a command to the selector 61 and the selector 61 selects one of the delay lines. The dot forming signal is passed through the selected delay line, and the selector 61 outputs a delayed signal determined by the selected delay line. Therefore, it is possible to control the size and the position of the dot images formed on the photosensitive drum 11, by the driver selecting means 43 and the position controlling means 44.

Figure 10:
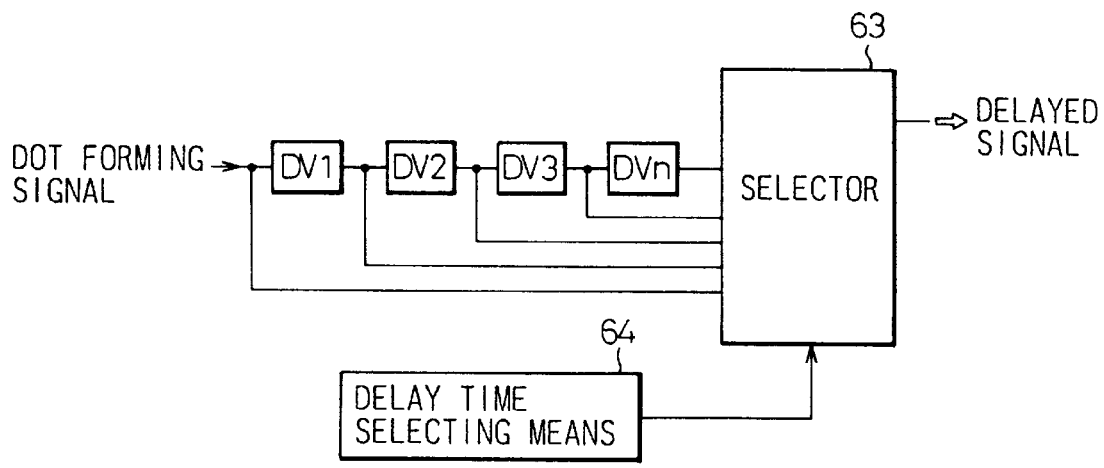
FIG. 10 is a block diagram of another example of the delay circuit including non-inverting elements.

FIG. 10 shows another example of the delay circuit. In this example, four non-inverting elements such as buffers DV1, DV2, DV3, and DV4 are arranged in series, and a selector 63 and a delay time selecting part 64 are also arranged. A lead is connected between the selector 63 and each connecting point before the respective non-inverting elements so that the selector 63 can select the number of the non-inverting elements to be used. Each of the non-inverting elements DV1, DV2, DV3, and DV4 can delay a signal by a time Td, and the signal is thus delayed a time corresponding to the product of the times Td by the number of the non-inverting elements through which the signal is passed.

Figure 11:
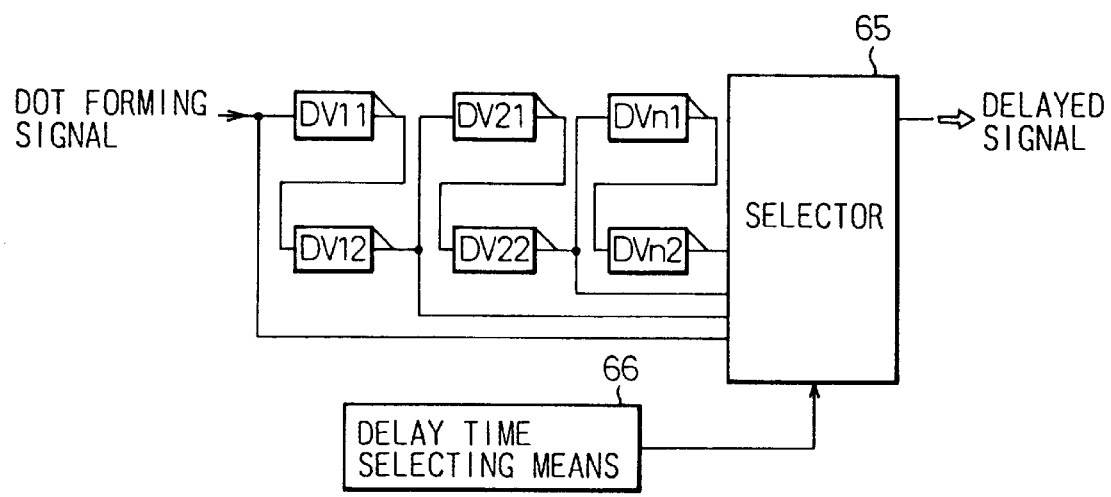
FIG. 11 is a block diagram of a further example of the delay circuit including inverting elements.

FIG. 11 shows a further example of the delay circuit. In this example, the delay elements comprise inverting elements such as NOT circuits used in ICs, for example. The inverting elements DV11, DV12, DV21, DV22, DBn1, and DVn2 are arranged in pairs, and three pairs are arranged in series. A selector 65 and a delay time selecting part 66 are also arranged, and a lead is connected between the selector 64 and each connecting point. Each of the inverting elements DV11, DV12, DV21, DV22, DBn1, and DVn2 can delay a signal by a time Tr, and the signal is thus delayed by 2Tr when passing through each pair. The signal is thus delayed by a time corresponding to the product of the time 2Tr by the number of pairs of the inverting elements through which the signal is passed.

FIG. 12 shows a further example of the delay means using a printing position controlling clock having a frequency higher than that of the basic dot control clock. The basic dot control clock is used for determining the dot forming signal at a predetermined interval. The printing position controlling clock electrically modifies a clock signal of the basic dot clock. For example, a delayed signal "C" is delayed by a time T1 (corresponding to one cycle of the printing position controlling clock) relative to the dot forming signal, and a delayed signal "D" is delayed by a time 2T1 relative to the dot forming signal with the length of the pulse changed to 2T1. The dot forming signal is stored in a buffer or the like for the delaying time.

The dot image formed on the photosensitive drum 11 has a size corresponding to the length of the pulse of the dot forming signal. When the length of the pulse of the dot forming single is small, a small dot image is formed. When the length of the pulse of the dot forming signal is large, a large dot image extended in the scanning direction and also in the direction perpendicular to the scanning direction is formed. Therefore, it is possible to form the dot image having a desired size, by appropriately selecting the clock numbers of the printing position controlling clock.

FIGS. 13A to 17B show a smoothing technique applied to the present invention so that a picture comprising a plurality of dot images is smoothed and/or rearranged to enhance the quality of the picture.

Figure 13A:
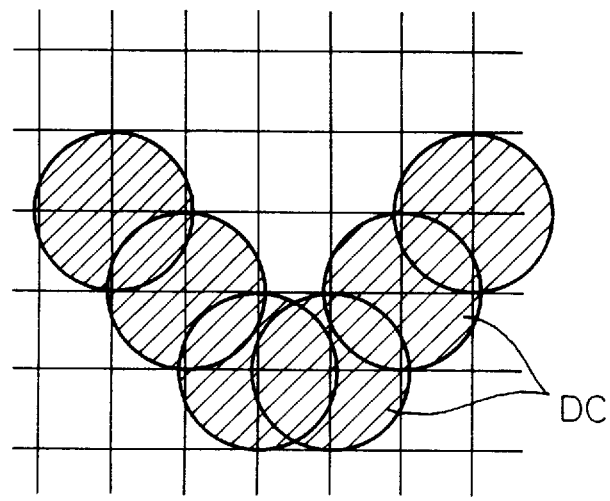
FIG. 13A is a view of the dot images representing a V-shaped picture.
Figure 13B:
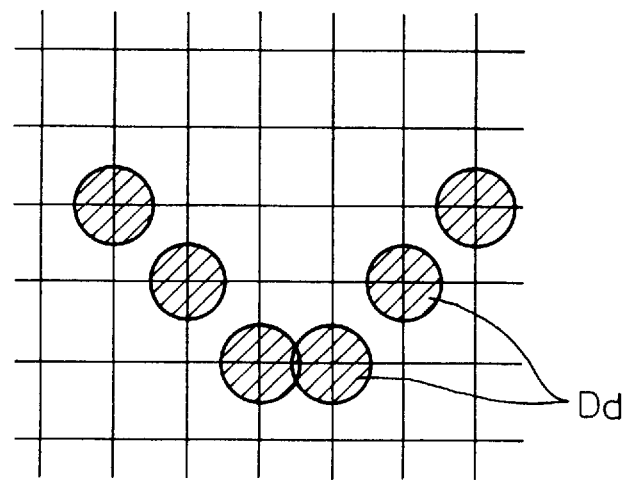
FIG. 13B is a view of the dot images similar to those of FIG. 13A, the dot images being smaller than those of FIG. 13A.

FIGS. 13A and 13B show dot images formed on the photosensitive drum 11 and subsequently converted into toner images. The dot size selecting means 45 and the selecting switch 46 of FIG. 4 are used in this example. The dot selecting means 45 can change the driver selecting means 43 between a first mode of operation in which a diode driving circuit (42a, for example) providing a first driving current is selected for forming a certain dot image and a second mode of operation in which a driving circuit providing a second driving current (42b, for example) is selected for forming a certain dot image identical to the certain dot image formed by the first driving current, the first driving current being different from the second driving current, in response to the manual operation of the selecting switch 46.

FIG. 13A shows the formed dot images Dc representing a V-shape, obtained by one of the first and second modes of operation, and FIG. 13B shows the formed dot images Dd representing the same V-shape, obtained by the other of the first and second modes of operation. The size of the dot images Dc of FIG. 13A are larger than that of the dot images Dd of FIG. 13B. It will be apparent that the dot images Dc of FIG. 13A are formed by a higher driving current and the dot images Dd of FIG. 13B are formed by a lower driving current. The mode of operation by which the dot images Dd of FIG. 13B are formed can be called an economy mode and can be used to reduce the consumption of the toner used in the developing unit 15. The economy mode may be selected when a draft document is printed, for example.

Figure 14A:
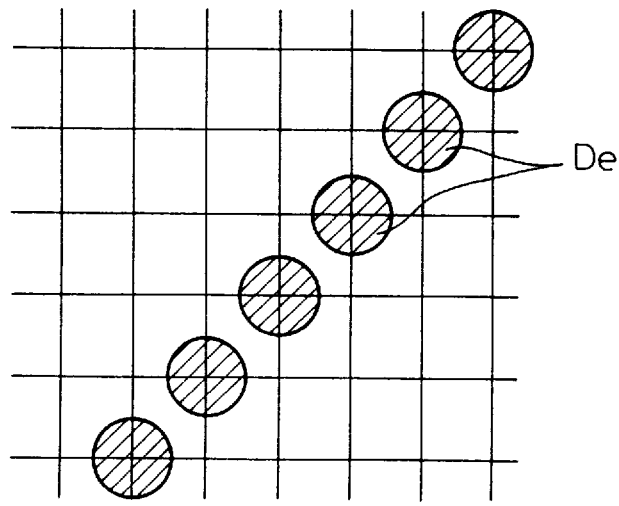
FIG. 14A is a view of the dot images representing an inclined line.
Figure 14B:
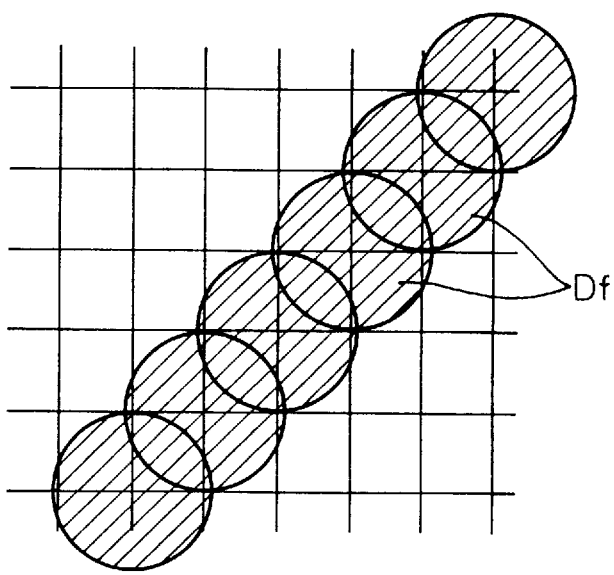
FIG. 14B is a view of the dot images similar to those of FIG. 14A, the dot images being larger than those of FIG. 14A.

FIG. 14A shows the formed dot images De representing an inclined line. When an inclined line comprises a plurality of dot images De, there is a tendency that the dot images De are arranged discontinuously and the inclined line seems thin. Therefore, it is preferable that an inclined line comprises larger dot images Df, as shown in FIG. 13B, compared with the case where an inclined line comprises smaller dot images De, as shown in FIG. 13A. Therefore, if the driver controlling part 41 detects an inclined line, based on the analysis of the dot forming position signal, a driver circuit providing a higher driving current is selected when those dot images Df representing an inclined line are formed. Accordingly, it is possible to avoid the thinning of an inclined line and to obtain a smooth inclined line.

Figure 15A:
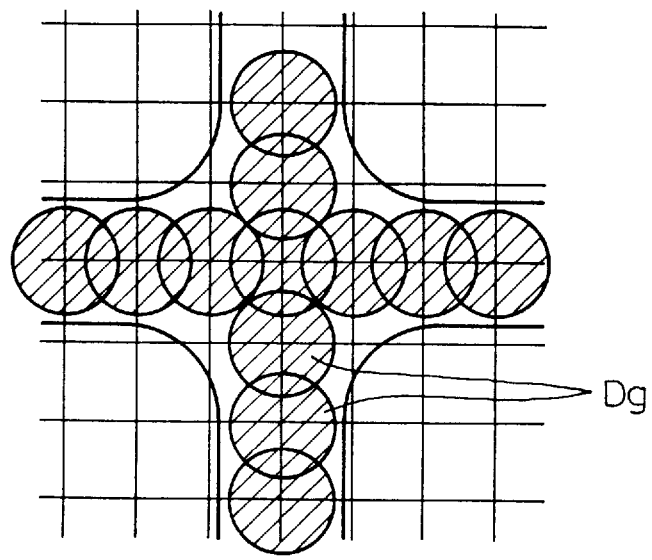
FIG. 15A is a view of the dot images representing a cross.
Figure 15B:
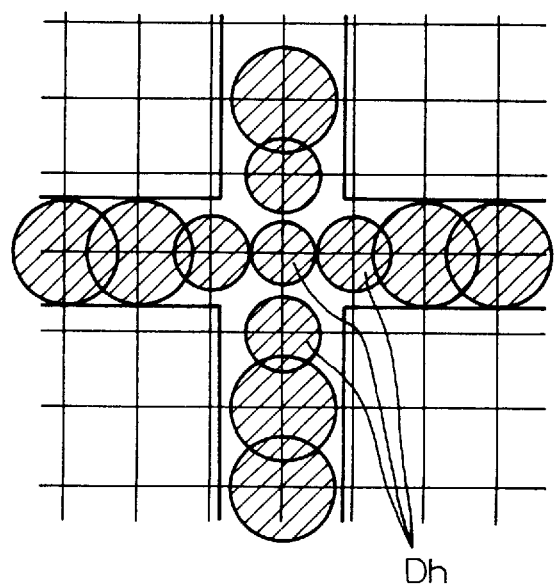
FIG. 15B is a view of the dot images similar to those of FIG. 15A, the dot images in the central region being smaller than those of FIG. 15A.

FIG. 15A shows the formed dot images Dg representing a cross. When a cross comprising intersecting vertical and horizontal lines is formed, the central region of the cross (formed by the dot images located on or near the crossing point) seems dense or dark, and it is preferable that the central region of the cross comprises smaller dot images Dh, as shown in FIG. 15B, compared with the case where the central region of the cross comprises larger dot images Dg, as shown in FIG. 15A. Therefore, if the driver controlling part 41 detects a cross, based on the analysis of the dot forming position signal, a driver circuit providing a lower driving current is selected when those dot images Dh representing the central region of a cross are formed. Accordingly, it is possible to reduce the density of the central region of a cross to avoid a bulge in the central region of a cross and to obtain a smooth cross.

FIG. 16A shows the formed dot images Di representing a vertical line extending generally perpendicular to a scanning direction and having a step S. This vertical line comprises two row of vertically arranged dot images Di. In this case, the dot images Dj on or near the step S are progressively displaced in the scanning direction to smooth the step S, as shown in FIG. 16B. This is realized by using the above described delaying technique. It is also possible to advance the position of the dot images in the scanning direction, in reverse to the delaying direction. This is realized by advancing the starting point of the dot forming signal by a time T1 corresponding to one cycle of the printing position controlling clock. In this way, it is possible to correct a vertical line having a step to a smooth line without a step by displacing the dot images in the scanning direction.

Figure 17A:
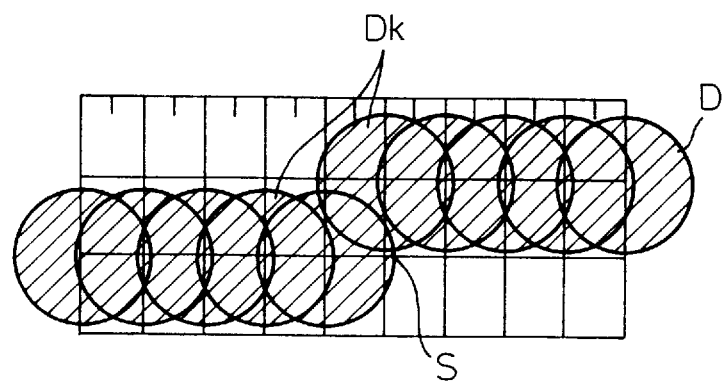
FIG. 17A is a view of the dot images representing a horizontal line having a step.
Figure 17B:
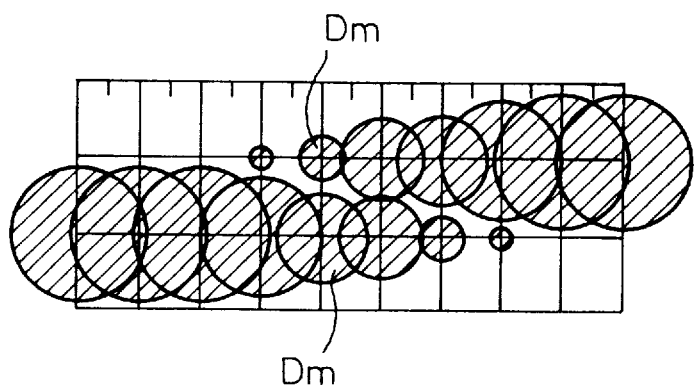
FIG. 17B is a view of the dot images similar to those of FIG. 17A, the dot images on or near the step being divided into two rows of small dot images.

FIG. 17A shows the formed dot images Dk representing a horizontal line extending generally parallel to a scanning direction and having a step S. This horizontal line comprises two row of horizontally arranged dot images Dk. If the driver controlling part 41 detects a horizontal line having a step S, based on the analysis of the dot forming position signal, a driver circuit providing a lower driving current is selected when those dot images located on or near the step S. Therefore, the formed dot images Dm and Dn has a small size, and the size is progressively changed, as shown in FIG. 17B. In addition, the dot images Dk located on or near the step S of FIG. 17A are divided into a plurality rows of small dot images Dm and Dn extending parallel to the scanning direction, as shown in FIG. 17B. The change of the size of the dot images Dm on the upper row is in reverse to the change of the size of the dot images Dn on the lower row. Accordingly, it is possible to change a horizontal line having a step to a smooth line without a step by changing the size of the dot images and dividing the dot images. In this way, the vertical line having a step is smoothed.

As described above, according to the present invention, it is possible easily change the size of the dot images formed on the photosensitive drum at a high speed, and to realize a gray scale capable method. It is also possible to realize a highly dense image formation by increasing the size of the dot images as desired. In addition, the gray scale capable method can be utilized as will, and it is possible to improve the quality of the obtained picture by appropriately correcting lines or the like using the gray scale capable method and a signal delaying technique.

I claim:

1. An image forming apparatus comprising:
   a photosensitive member;
   a laser source emitting a laser beam for irradiating the photosensitive member;
   driver means for driving the laser source to form dot images on the photosensitive member in accordance with a given data, said driving means including a plurality of selective driving circuits each providing a driving current different in magnitude from magnitudes of driving currents provided by other driving circuits of said driving means; and
   control means for selecting at least one of said driving circuits in accordance with the given data, including smoothing means for smoothing and rearranging a shape of a picture comprising a plurality of dot images to be formed relative to a shape of a picture comprising a plurality of corresponding dots in a given data, the smoothing and rearranging including changing the size of the dot images by changing the driving current based on the selection of driving circuits.

2. An image forming apparatus according to claim 1, wherein a formed dot image has a size corresponding to a current determined by the selected at least one driving circuit.

3. An image forming apparatus according to claim 1, wherein said control means further includes clock means for cyclically delivering a clock signal at a predetermined interval to form dot images along a scanning line, and delay means for causing said laser source to emit a laser beam at a delayed timing relative to a timing determined by said clock means.

4. An image forming apparatus according to claim 3, wherein said delay means comprises at least one of delay lines, non-inverting elements and inverting elements.

5. An image forming apparatus according to claim 3, where said delay means comprises means for electrically modifying a clock signal of said clock means.

6. An image forming apparatus according to claim 1, wherein each of the driving circuits includes a transistor.

7. An image forming apparatus according to claim 1, wherein each of the driving circuits includes a transistor and a resistor.

8. An image forming apparatus according to claim 1, wherein the dot images are subsequently converted into toner images, and further comprising dot selecting means for changing the control means between a first mode of operation in which a driving circuit providing a first driving current is selected for forming a certain dot image and a second mode of operation in which a driving circuit providing a second driving current is selected for forming a certain dot image identical to the certain dot image formed by the first driving current, the first driving current being different in magnitude from the second driving current.

9. An image forming apparatus according to claim 1, wherein said control means includes means for generating a dot forming position signal and a driver selecting signal, and driver selecting means for selecting at least one of said driving circuits in response to the dot forming position signal and the driver selecting signal.

10. An image forming apparatus according to claim 1, wherein when an inclined line is to be formed by the dot images, a driving circuit providing a third driving current is selected by said smoothing means, the third driving current being greater in magnitude than a driving current provided by another driving circuit which is to be selected when a vertical or horizontal line is formed.

11. An image forming apparatus according to claim 1, wherein when a cross shape having a crossing point is to be formed by the dot images, a driving circuit providing a fourth driving current is selected by said smoothing means for forming dot images on or near the crossing point, the fourth driving current being smaller in magnitude than a driving current provided by another driving circuit which is to be selected when a vertical or horizontal line is formed.

12. An image forming apparatus according to claim 1, wherein when a vertical line extending generally perpendicular to a scanning direction and having a step therein is to be formed by the dot images, the dot images on or near the step are displaced by said smoothing means in the scanning direction to smooth the step.

13. An image forming apparatus according to claim 1, wherein when a horizontal line extending generally parallel to a scanning direction and having a step therein is to be formed by the dot images, a driving circuit providing a fifth driving current is selected by said smoothing means, the fifth driving current being smaller in magnitude than a driving current provided by another driving circuit which is to be selected when a vertical or horizontal line is formed.

14. An image forming apparatus according to claim 13, wherein when the dot images on or near the step are formed, said smoothing means divides the dot images into a plurality of rows of small dot images extending parallel to a scanning direction.

15. The image forming apparatus according to claim 1, wherein said plurality of selective driving circuits each include an output for providing driving currents, each output being operatively connected at a node and said node being operatively connected to said laser source.

\* \* \* \* \*